United States Patent [19]

Ikefuji et al.

[11] Patent Number: 5,029,203
[45] Date of Patent: Jul. 2, 1991

[54] SIDE TONE PREVENTIVE CIRCUIT FOR TELEPHONE

[75] Inventors: Yoshihiro Ikefuji; Shozo Miyagawa; Mitsuhiko Noda, all of Kyoto, Japan

[73] Assignee: Rohm Co., Ltd., Kyoto, Japan

[21] Appl. No.: 441,321

[22] Filed: Nov. 27, 1989

[30] Foreign Application Priority Data

Nov. 30, 1988 [JP] Japan .............................. 63-303300
Dec. 22, 1988 [JP] Japan .............................. 63-323868

[51] Int. Cl.$^5$ ............................................ H04M 1/58
[52] U.S. Cl. .................................. 379/391; 379/392
[58] Field of Search ................ 379/387, 391, 392, 394

[56] References Cited

U.S. PATENT DOCUMENTS

| | | | |
|---|---|---|---|
| 3,441,684 | 4/1969 | McLeod | 379/392 |
| 3,462,560 | 8/1969 | Holzman | 379/391 X |
| 3,647,982 | 3/1972 | van der Puije | 379/392 |
| 4,081,620 | 3/1978 | Goodman et al. | 379/391 |
| 4,283,675 | 8/1981 | Sparber | 324/650 |
| 4,354,060 | 10/1982 | Niertit et al. | 379/391 |
| 4,715,064 | 12/1987 | Claessen | 379/392 |

FOREIGN PATENT DOCUMENTS

| | | | |
|---|---|---|---|
| 0051135 | 5/1981 | Japan | 379/392 |
| 0125145 | 10/1981 | Japan | 379/392 |
| 0231959 | 12/1984 | Japan | 379/392 |
| 0185452 | 9/1985 | Japan | 379/392 |
| 0214850 | 9/1986 | Japan | 379/392 |

Primary Examiner—Jin F. Ng
Assistant Examiner—M. Shehata
Attorney, Agent, or Firm—Oliff & Berridge

[57] ABSTRACT

A side tone preventive circuit for telephones which prevents the output of the transmitter on the speaker's side from being transmitted to the receiver on the same side. The balance of the impedance bridge in a bridge circuit for separating a transmission signal and a reception signal is automatically adjusted in accordance with the circuit impedance at the location at which a telephone is installed. An impedance measuring circuit measures the impedance of the telephone circuit, and a balance adjustment circuit the impedance of which is adjustable is provided in the bridge circuit. The impedance of the telephone circuit is measured at the time of installation of a telephone, and the impedance of the balance adjustment circuit is adjusted in correspondence with the result of measurement. Thus, the impedance balance of the bridge circuit is adjusted in correspondence with the circuit impedance, thereby effectively preventing a side tone.

16 Claims, 7 Drawing Sheets

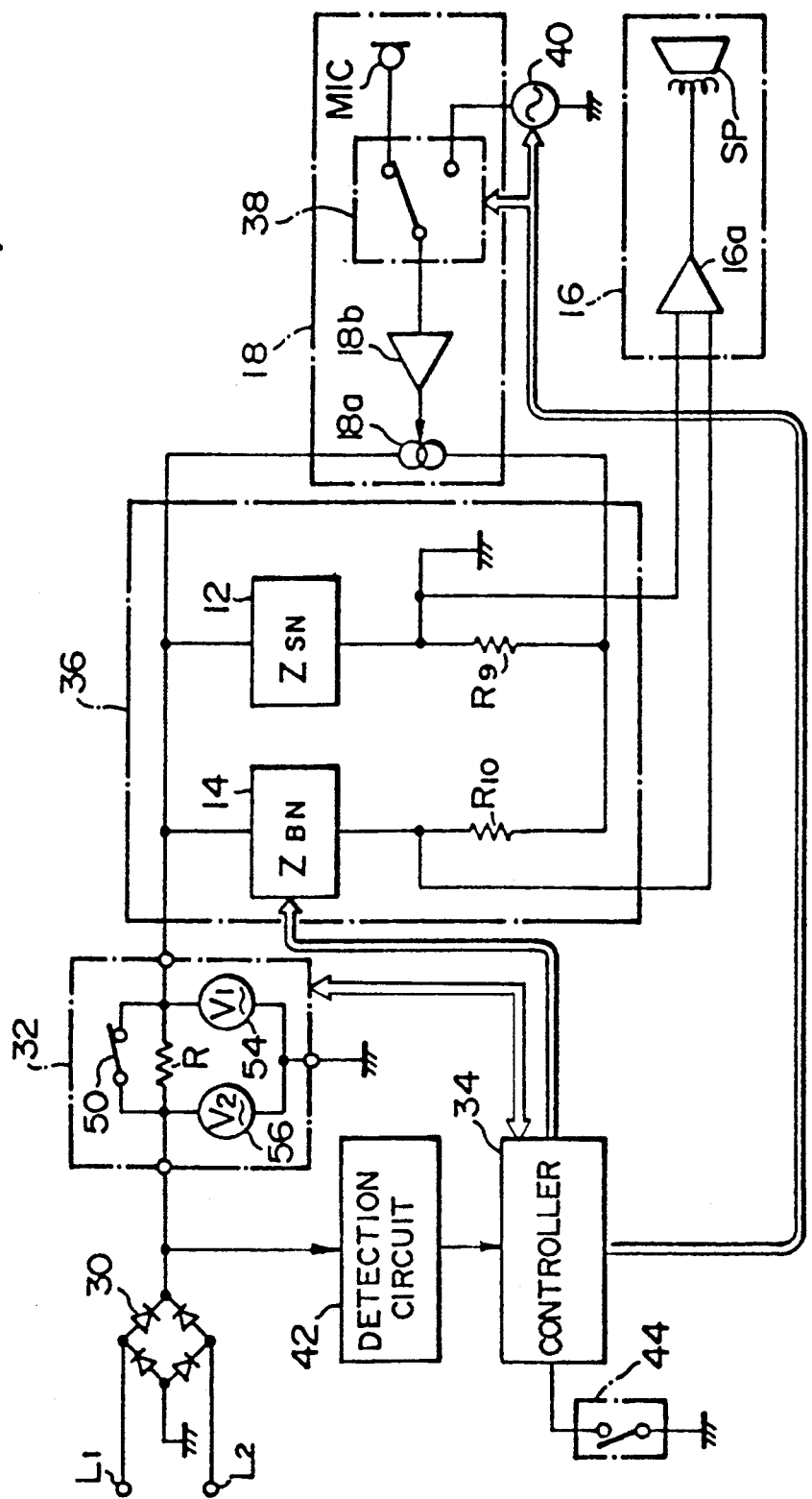

LED-CdS

Lamp-CdS

MCS-FET

J-FET

SIDE TONE PREVENTIVE CIRCUIT FOR TELEPHONE

BACKGROUND OF THE INVENTION

1. Field of the Invention

The present invention relates to an improved side tone preventive circuit for telephones, namely, a circuit for preventing the output of the transmitter on the speaker's side from being transmitted (output) to the receiver on the same side.

2. Description of the Related Art

Most of the present telephones are connected to a two-wire telephone circuit, which is divided into a circuit on the receiver's side and a circuit on the transmitter's side by a two-wire/four-wire converter consisting of an impedance bridge, and a signal that is transmitted. When the balance of the impedance bridge is lost, the output of the transmitter on the speaker's side is transmitted to the receiver on the same side, so that the voice of the speaker is output from the receiver, thereby disturbing good communication. To prevent such a side tone in a conventional telephone, the impedance balance of the two-wire/four-wire converter is controlled.

The side tone preventive circuit in a conventional telephone will be explained with reference to FIG. 10. In FIG. 10, a telephone office 100 has an exchanger for connecting a plurality of telephone circuits. The exchanger has one trunk circuit 10 per telephone circuit connected thereto. The telephone circuit from the telephone office 100 is connected to a telephone 300 installed in a home or the like through telephone lines 200.

Each telephone line 200 is composed of a resistance of the telephone line itself, which changes in accordance with the diameter of the line, the distance between telephone 300 and trunk circuit 10, and the like; and a stray capacitance which is parasitic on the resistance, as schematically shown in FIG. 10. Telephone lines 200 can therefore equivalently represented by resistors $R_L$, capacitors $C_L$ and the like, as shown in FIG. 10.

The circuit impedance $Z_L$ seen from the side of telephone 300 is determined by the impedance of trunk circuit 10 and the telephone lines 200 seen from side of the connecting terminals $L_1$ and $L_2$ of telephone 300.

Telephone 300 has an internal circuit 12 connected across connecting terminals $L_1$ and $L_2$ so that internal circuit 12, telephone line 200 and trunk circuit 10 are connected with each other in parallel. Connecting terminal $L_2$ is grounded, and balance impedance elements $R_9$ and $R_{10}$ for forming a bridge circuit are connected in series to connecting terminal $L_2$. One end of a balance adjustment circuit 14 is connected to connecting terminal $L_1$, and the other end thereof is connected to one end of balancing resistance $R_{10}$. In this way, the balancing resistances $R_9$ and $R_{10}$, balance adjustment circuit 14 and the circuit consisting of internal circuit 12 and the external circuit comprising telephone line 200 and trunk circuit 10 which are connected with each other in parallel constitute an impedance bridge.

A receiver 16 is provided between connecting terminal $L_2$ and the junction of resistor $R_{10}$ and balance adjustment circuit 14, and a transmitter 18 is provided between the junctions of the resistors $R_9$ and $R_{10}$ and the connecting terminal $L_1$.

Therefore, if the impedance thereof satisfies the following relationship:

$$(Z_L // Z_{SN}) \cdot R_{10} = Z_{BN} \cdot R_9$$

the impedance bridge satisfies the balancing condition, so that the output of the transmitter 18 is not transmitted to the receiver 16. $Z_L // Z_{SN}$ represents impedance of $Z_L$ and $Z_{SN}$ connected in parallel.

In such a conventional impedance bridge, if the above-described balancing condition is satisfied, a sufficiently good side tone prevention is achieved. However, the circuit impedance $Z_L$ seen from the side of telephone 300 greatly changes in accordance with the diameter of telephone line 200 and the distance between telephone 300 and trunk circuit 10. A line having a diameter of 0.32, 0.4, 0.5, 0.65, 0.9 mm or the like is typically used as telephone line 200, and the loss of signal level changes by about 0 to 7 dB in accordance with the length, of telephone line 200. Therefore, the circuit impedance $Z_L$ greatly changes depending upon the state in which telephone 300 is installed. However, since balance adjustment circuit 14 in a conventional telephone 300 is composed of a stationary CR circuit net, it cannot respond to the impedance $Z_L$ of the telephone circuit which greatly changes.

It is at only one point in the greatly variable impedance $Z_L$ of the telephone circuit that the impedance bridge satisfies the balancing condition, and the impedance bridge is not balanced under other conditions. Therefore, when the circuit impedance $Z_L$ changes, it is impossible to achieve good side tone prevention.

SUMMARY OF THE INVENTION

Accordingly, it is an object of the present invention to eliminate the above-described problems in the related art and to provide a side tone preventive circuit for telephones which is capable of balancing the impedance bridge so as to obtain a good side tone preventing property under varying telephone circuit conditions.

To achieve this aim, a side tone preventive circuit for telephones according to the present invention comprises: an impedance measuring circuit which is connected to the connecting terminal of a telephone circuit so as to measure the impedance of the telephone circuit; a bridge circuit for connecting the connecting terminal with a receiver and a transmitter and balancing the impedance at the connecting terminal of the receiver. The bridge circuit includes a telephone internal circuit having a predetermined impedance, balance impedance elements and a balance adjustment circuit the preventive circuit further includes; a controller for controlling the impedance of the balance adjustment circuit in accordance with the result of the measurement of the impedance measuring circuit so that the balancing condition of the bridge circuit is satisfied by changing the impedance of the balance adjustment circuit in accordance with the measured impedance of the telephone circuit so as to prevent a side tone.

In the side tone preventive circuit for telephones according to the present invention having the above-described structure, it is possible to measure the impedance of the telephone circuit by the impedance measuring circuit. The impedance of the balance control circuit is controlled on the basis of the result of the measurement. It is therefore possible to constantly balance the bridge circuit even if the circuit impedance of the telephone circuit greatly varies, thereby realizing good side tone prevention.

The above and other objects, features and advantages of the present invention will become clear from the following description of the preferred embodiment thereof, taken in conjunction with the accompanying drawings.

BRIEF DESCRIPTION OF THE DRAWINGS

FIG. 1 is a schematic block diagram of one embodiment of a side tone preventive circuit for telephones according to the present invention;

DESCRIPTION OF THE PREFERRED EMBODIMENT

Figure 2A:
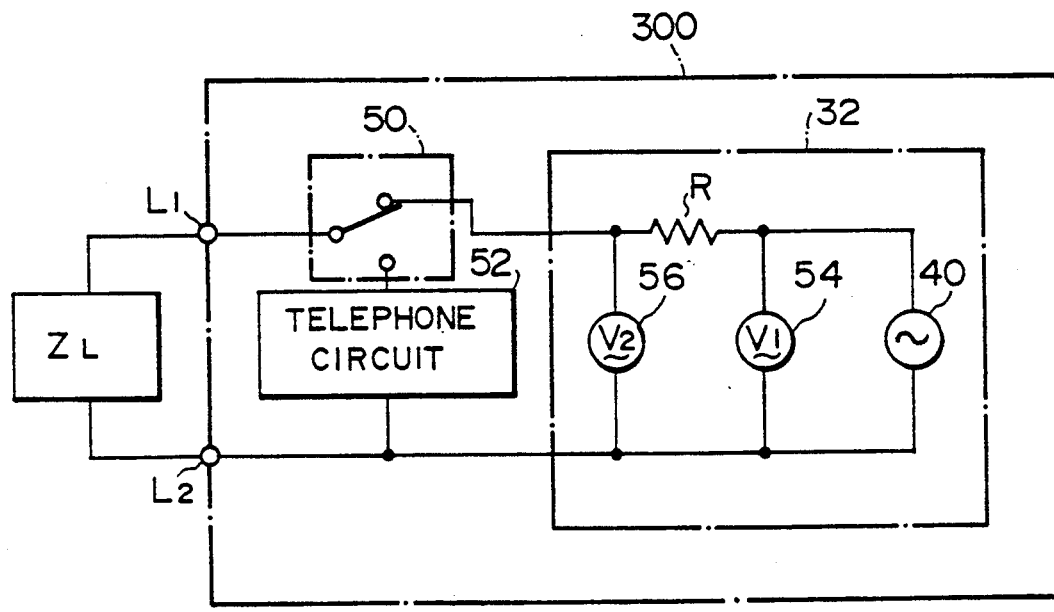
FIGS. 2(A) and 2(B) are schematic block diagrams of two exemplary embodiments of the impedance measuring circuit in the embodiment shown in FIG. 1.

An embodiment of a side tone preventive circuit for telephones will be explained with reference to the accompanying drawings.

FIG. 1 is a schematic block diagram of the structure of an embodiment of a side tone preventive circuit for telephones according to the present invention. In FIG. 1, the connecting terminals $L_1$, $L_2$ of the telephone circuit, which are connected to an external two-wire telephone circuit, are connected to a rectifier 30 consisting of diodes connected in a bridge. The minus connective terminal of rectifier 30 is grounded and the plus connective terminal thereof is connected to an impedance measuring circuit 32.

Impedance measuring circuit 32 appropriately measures the impedance of the telephone circuit in response control signals from a balance adjustment circuit or controller 34. The output side of the impedance measuring circuit 32 is connected to a bridge circuit 36 for side tone prevention. At an ordinary time, when impedance circuit 32 is unnecessary, a switch 50 is turned on (closed) so that a signal is transmitted while bypassing impedance measuring circuit 32.

Figure 10:
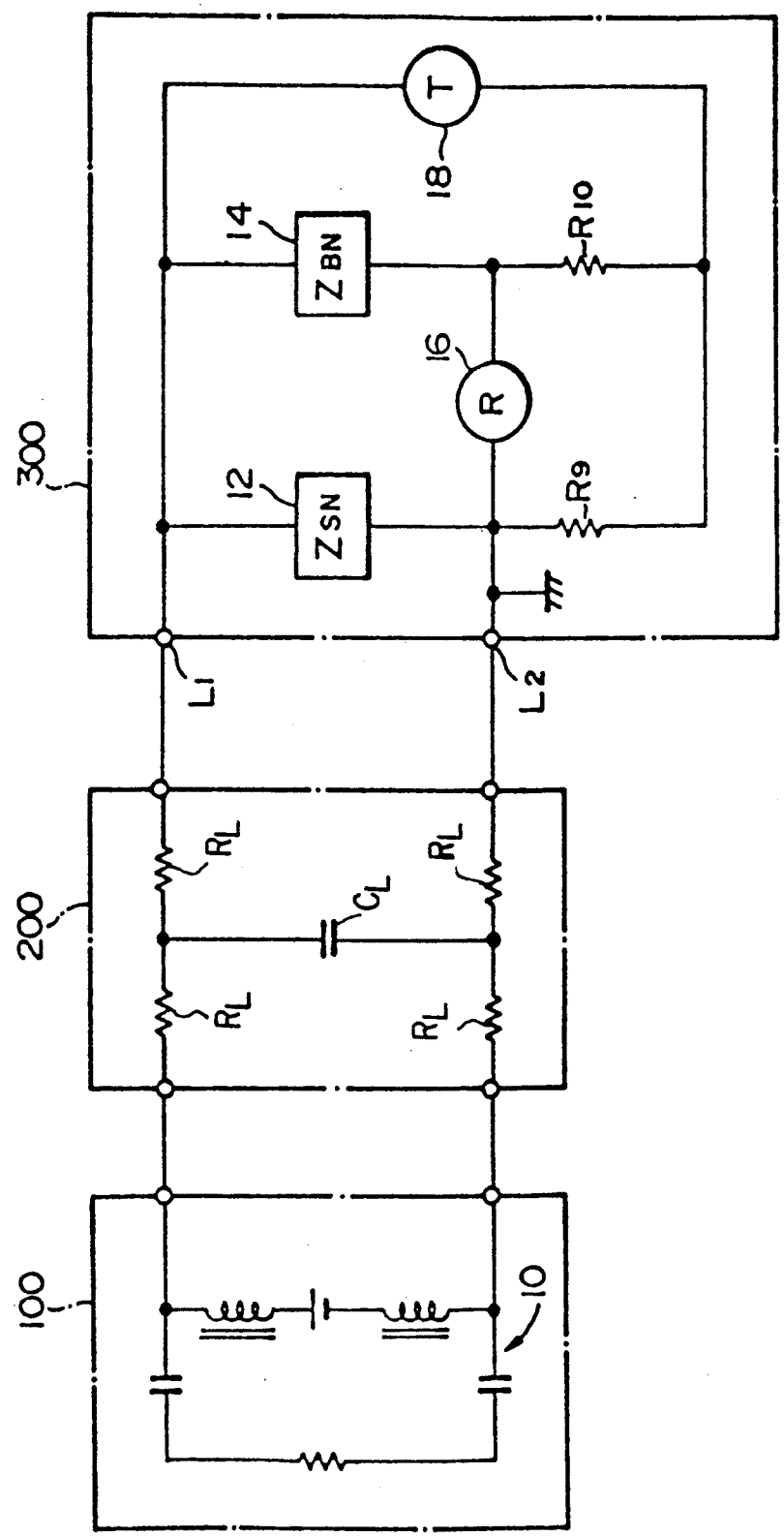
FIG. 10 is a schematic block diagram the structure of a conventional side tone preventive circuit for telephones.

Bridge circuit 36 for side tone prevention includes a telephone internal circuit 12, a balance adjustment circuit 14 and balance impedance elements $R_9$, $R_{10}$, as in the prior art shown in FIG. 10. A receiver 16 and a transmitter 18 are connected to bridge circuit 36.

Receiver 16 includes an operational amplifier 16a and a speaker SP. Transmitter 18 includes a current amplifier 18a, an operational amplifier 18b and a microphone MIC. In the present invention, a switch 38 is inserted between microphone MIC and operational amplifier 18b. Switch 38 can connect an oscillator 40 to operational amplifier 18b. A switch 44 turns on and off controller 34.

In the case of holding ordinary communication in a telephone having the above-described structure, when speaker SP inputs a voice signal into the microphone MIC of transmitter 18, a predetermined current flows in current amplifier 18a in correspondence with the voice signal and is output to the external telephone circuit through connecting terminals $L_1$, $L_2$. The signal input into the telephone circuit of the telephone is output from speaker SP of receiver 16 as a voice signal.

If the impedance of the bridge circuit 36 satisfies the following balancing condition:

$$(Z_L // Z_{SN}) \cdot R_{10} = Z_{BN} \cdot R_9$$

signal input into the transmitter 18 is not output from receiver 16.

A feature of the present invention is that impedance measuring circuit 32 can measure the impedance of the external telephone circuit to which the telephone is connected, namely, the circuit impedance $Z_L$. Such measurement of the circuit impedance $Z_L$ by impedance measuring circuit 32 is generally carried out when the telephone is installed.

In this embodiment, a detection circuit 42 is provided. Detection circuit 42 comprises, for example, an integrator circuit consisting of a resistor disposed on the power source side connected in series with a capacitor on the grounding side the integrator circuit measuring the potential of the connecting point of the resistor and the capacitor and outputting a pulse when the potential exceeds a predetermined threshold value. Since the integrator circuit outputs a pulse only when the voltage of the power source side changes from a low level to a high level, detection circuit 42 is capable of detecting the connection between the telephone and the telephone circuit. When detection circuit 42 detects the connection between telephone and the telephone circuit, the controller 34 is actuated, thereby enabling the measurement of the circuit impedance and the adjustment of the impedance.

The measurement of the circuit impedance is controlled by controller 34. More specifically, switch 38 is changed to connect with the oscillator 40 in response to control signal from controller 34, and oscillator 40 outputs a signal having a predetermined frequency to the telephone circuit. Consequently, the predetermined signal output from oscillator 40 is output to the external telephone circuit, whereby impedance measuring circuit 32 can measure the circuit impedance $Z_L$.

The circuit impedance $Z_L$ of the external telephone circuit measured by the impedance measuring circuit 32 in the above-described way is input to the controller 34. Controller 34 determines the resistances and the static capacitance in balance adjustment circuit 14 by a predetermined calculation based on the circuit impedance $Z_L$ of the external telephone circuit. The resistances and the static capacitance of balance adjustment circuit 14 are adjusted to the thus-determined values by the operation of a switch or the like in balance adjustment circuit 14.

It is preferable that after controller 34 is operated once at the time of installment, switch 44 is turned on so as to inhibit the operation of controller 34, which is unnecessary thereafter.

In this way, the circuit impedance $Z_L$ of the external telephone circuit is measured and the resistances and the static capacitance in balance adjustment circuit 14 are determined. Thus, bridge circuit 36 in the present invention is capable of constantly balancing the impedance $Z_L$. Accordingly, it is possible to constantly achieve good side tone prevention even if the circuit impedance $Z_L$ of the external telephone circuit greatly varies.

MEASUREMENT OF CIRCUIT IMPEDANCE $Z_L$

The measurement of the circuit impedance $Z_L$ will now be explained. As a measuring method, a resistance substitution method, a voltage and current measuring method, etc. are known.

The measurement of the circuit impedance $Z_L$ by a resistance substitution method will first be explained with reference to FIG. 1. In this example, a current is applied to a resistor R in impedance measuring circuit 32 by turning off (opening) bypass switch 50 so that impedance measuring circuit 32 is actuated.

Impedance measuring circuit 32 is also provided with two voltmeters 54, 56 connected so as to measure the voltage $V_1$ at the end of resistor R coupled to oscillator 40 and the voltage $V_2$ at the other end of resistor R. Switch 38 is operated so as to connect oscillator 40 to bridge circuit 36 in place of transmitter 18. When a signal having a predetermined frequency f is transmitted from oscillator 40, the circuit impedance $Z_L$ at the frequency f is obtained from the following formula:

$$|Z_L|f = R/(V_1/V_2 - 1)$$

Another example of impedance measuring circuit 32 is shown in FIG. 2(A). In the impedance measuring circuit 32 shown in FIG. 2(A), a telephone circuit 52 for operating a telephone as an ordinary telephone is disconnected by the change-over switch 50 and oscillator 40 is connected directly to impedance measuring circuit 32. In FIG. 2A, the external circuit impedance $Z_L$ of the telephone circuit at the connecting terminals $L_1$, $L_2$ of the telephone 300 is schematically represented by $Z_L$.

Impedance measuring circuit 32 has the resistor R and the two voltmeters 54, 56 as in the impedance measuring circuit 32 shown in FIG. 1. Voltmeters 54, 56 respectively measure the voltage $V_1$ at the end of resistor R coupled to oscillator 40 and the voltage $V_2$ at the other end of resistor R.

Figure 2B:
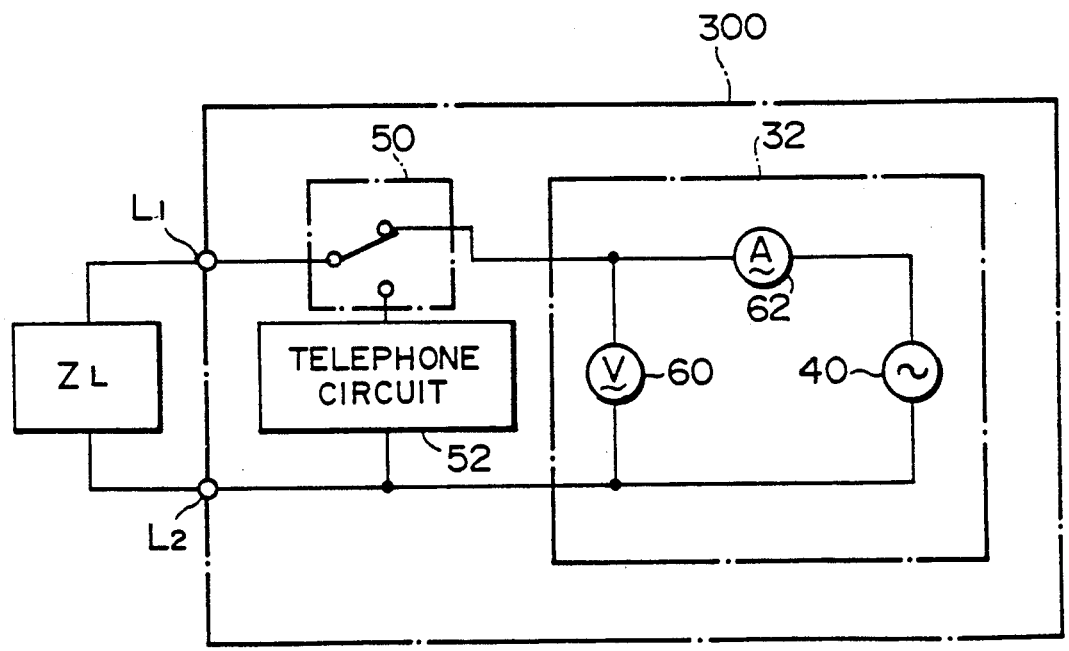

In the case of measuring the circuit impedance $Z_L$ by a voltage and current measuring method, a voltmeter 60 and an ampere meter 62 are connected across/in the circuit path from the oscillator 40 to the external telephone circuit, as shown in FIG. 2(B). The circuit impedance $Z_L$ is obtained from the following formula on the basis of the detected values V and I of voltmeter 60 and ampere meter 62, respectively:

$$|Z_L| = V/I$$

CALCULATION OF CIRCUIT IMPEDANCE $Z_L$

Figure 3:
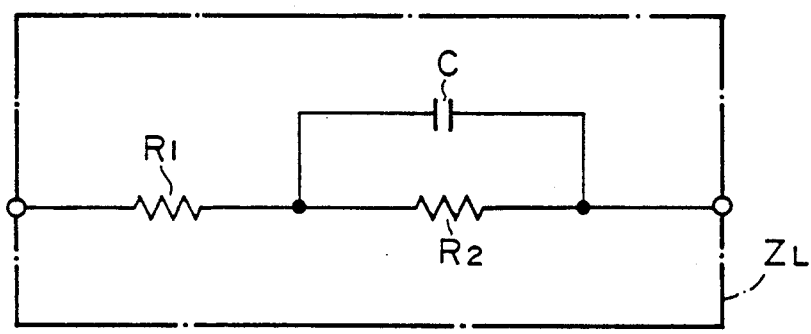
FIG. 3 shows an equivalent circuit of a circuit impedance $Z_L$.

The circuit impedance $Z_L$ is obtained in the above-described way. The circuit impedance $Z_L$ consists of a combination of resistance components $R_1$, $R_2$ and a stray capacitance C, as shown in FIG. 3. Calculation of these values will be explained hereinunder.

The circuit impedance $Z_L$ is equivalent to the circuit comprising a combination of resistors and a capacitor as shown in FIG. 3. That is, the equivalent circuit is composed of the resistor $R_1$, and a parallel connecting circuit of the resistor $R_2$ and the capacitor C which is connected to the resistor $R_1$ in series. In this kind of circuit, the circuit impedance $Z_L$ is different depending upon the frequency f of the signal applied thereto.

Figure 4:
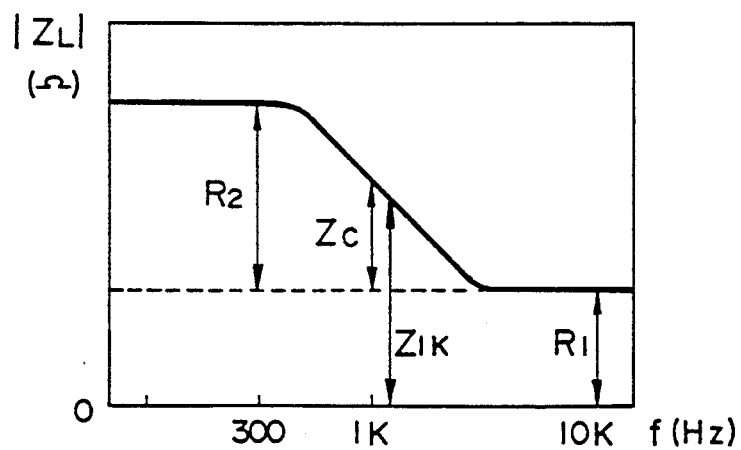
FIG. 4 is a characteristic curve of the frequency characteristic of the circuit impedance $Z_L$.

The frequency characteristic of the circuit impedance $Z_L$ is shown in FIG. 4. A capacitor has a low impedance at a high frequency and a high impedance at a low frequency. Therefore, when the frequency is about 300 $H_Z$, the value of the capacitor C is substantially infinite; while the value of the capacitor C is substantially 0Ω and, hence, the capacitor is short-circuited at a frequency of about 10 kHz, as shown in FIG. 4. Consequently, it is possible to obtain the value of the resistor $R_1$ of the circuit by measuring the circuit impedance $Z_L$ at a frequency of 10 kHz.

$$R_1 = |Z_L|_{10k}$$

The circuit impedance $Z_L$ a frequency of 300 Hz is an impedance of the resistor $R_1$ and the resistor $R_2$ connected in series. Accordingly, the value of the resistor $R_2$ is obtained by subtracting the value of resistor $R_1$ from the circuit impedance $Z_L$ at that time:

$$R_2 = |Z_L|_{300} - R_1$$

Figure 5:
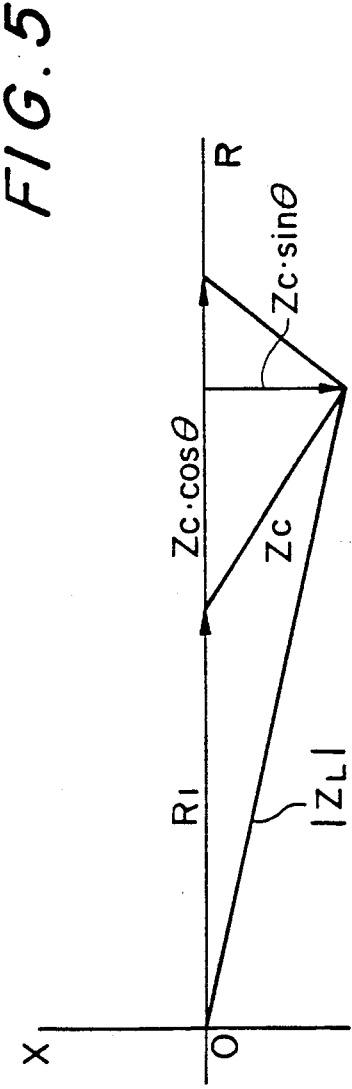
FIG. 5 is a graphical representation of the locus of the circuit impedance $Z_L$.

The value of the capacitor C in the circuit impedance $Z_L$ is then obtained from the circuit impedance $Z_L$ at a frequency of 1 $kH_Z$. As shown in FIG. 4, the circuit impedance $Z_L$ at a frequency of 1 $kH_Z$ is the impedance of the circuit composed of the resistor $R_1$ and a parallel connecting circuit of the resistor $R_2$ and the capacitor C. It is now assumed that the impedance of the parallel connection circuit of the resistor $R_2$ and the capacitor C is $Z_c$. The locus of the circuit impedance is such as that shown in FIG. 5.

The circuit impedance $Z_L$ is therefore represented by the following formula:

$$|Z_L| = (R_1 - Z_c \cos\theta)^2 + (Z_c \sin\theta)^2$$

By transforming the formula, the following formula is obtained:

$$|Z_L| - R_1^2 = 2 \cdot R_1 \cdot Z_c \cdot \cos\theta + Z_c^2$$

Since the resistor $R_2$ and the capacitor C are connected in parallel, the impedance thereof is represented by the following formula:

$$1/Z_c^2 = 1/X_c^2 + 1/R_2^2$$

wherein $X_c = |1/\omega \cdot C|$

The following relationship holds in the parallel circuit of the resistor $R_2$ and the capacitor C:

$$\theta = \tan^{-1} R_2/X_c$$

Accordingly, the following relationship is introduced:

$$\cos\theta = X_c/(X_c^2 + R_2^2)^{\frac{1}{2}}$$

$X_c$ is obtained from this relationship equation as follows:

$$X_c = \{R_2^2 \cdot (Z_L^2 - R_z^2)/(2 \cdot R_2 \cdot R_2 + R_2^2 - Z_L^2 + R_1^2)\}^{\frac{1}{2}}$$

Since $\omega = 2\pi f$ (wherein f represents frequency), the value of the capacitor C is obtained as follows:
$C = \frac{1}{2}\pi f \cdot \{R_2^2 \cdot (Z_L^2 - R_1^2)/(2 \cdot R_1 \cdot R_2 + R_2^2 - Z_L^2 + R_1^2)\}^{\frac{1}{2}}$ By substituting the value of the circuit impedance $Z_L$ at a frequency of 1 kHz (f=1 kHz) into the above formula, the value of the capacitor C of the bridge circuit is obtained.

In this way, the circuit impedance $Z_L$ is obtained.

ADJUSTMENT OF THE IMPEDANCE $Z_{SN}$ OF THE TELEPHONE INTERNAL CIRCUIT

It is impossible to match the impedance $Z_{BN}$ of balance adjustment circuit 36 and the impedance of another circuit if the impedance of telephone internal circuit 12 is also in a predetermined range. If the impedance $Z_{SN}$ of the telephone internal circuit is intended to be set at about 620 Ω, a resistor is inserted in the telephone internal circuit at a predetermined position to adjust the impedance.

ADJUSTMENT OF THE IMPEDANCE $Z_{BN}$ OF THE BALANCE ADJUSTMENT CIRCUIT

When the circuit impedance $Z_L$ and the impedance $Z_{SN}$ of telephone internal circuit 12 are determined, the impedance $Z_{BN}$ of balance adjustment circuit 14 is adjusted in correspondence with these values.

Figure 6:
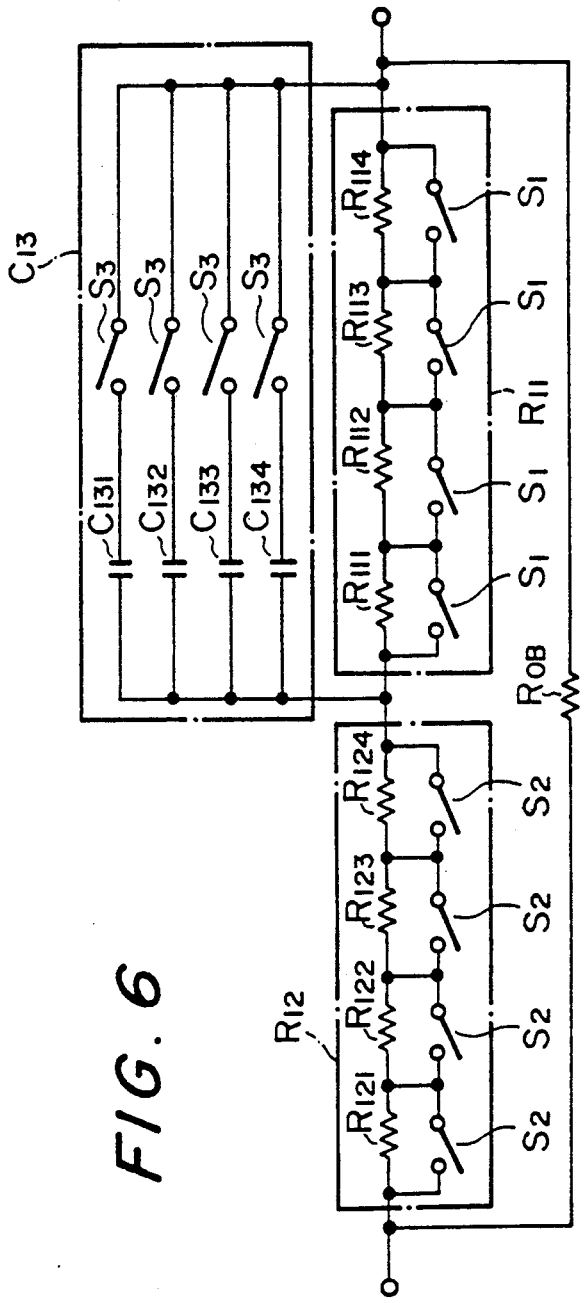
FIG. 6 is a circuit diagram of an exemplary embodiment of the balance adjustment circuit shown in FIG. 1.

The resistances and the capacitance of balance adjustment circuit 14 are adjusted by controlling the groups $S_1$, $S_2$ and $S_3$ of switches appropriately, and controlling the connections between resistors $R_{121}$ to $R_{124}$, $R_{111}$ to $R_{114}$ and capacitors $C_{131}$ to $C_{134}$, as shown in FIG. 6. For example, if the values of the resistors $R_{121}$ to $R_{124}$, $R_{111}$ to $R_{114}$ and the capacitors $C_{131}$ to $C_{134}$ are set at 1 : 2 : 4 : 8, respectively, the resistances and the capacitance of balance adjustment circuit 14 can be set at 1 to 15 times of the respective values.

Figure 7:
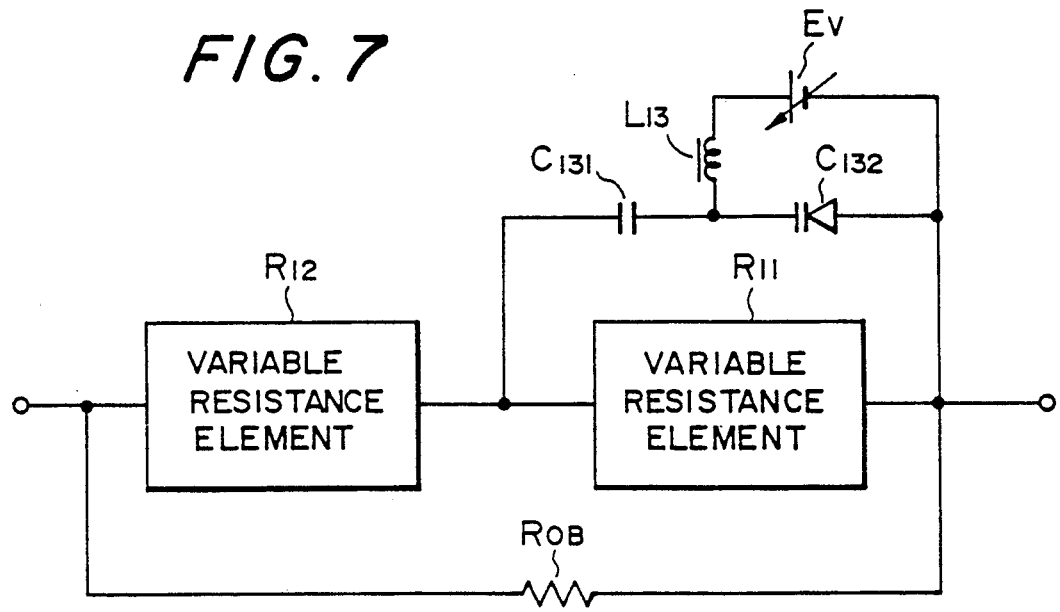
FIG. 7 is a circuit diagram of another exemplary embodiment of the balance adjustment circuit shown in FIG. 1.

Balance adjustment circuit 14 can comprise variable resistance elements $R_{12}$, $R_{11}$ and $R_{OB}$, a capacitor $C_{131}$ and a variable capacity diode (Varicap diode) $C_{132}$, as shown in FIG. 7. In this case, the resistances and the static capacitance are changed by control signals from the controller 34.

The static capacitance of Varicap diode $C_{132}$ changes in correspondence with the inverse voltage applied thereto. The static capacitance is varied in correspondence with the inverse voltage applied thereto by a variable DC power source $E_V$. By a change in the static capacitance of the Varicap diode $C_{132}$, the static capacitance of the series connection circuit of the capacitance $C_{131}$ and Varicap diode $C_{132}$ is adjusted to a predetermined value. A coil $L_{13}$ removes an influence of the impedance of the variable DC power source $E_V$ which applies the voltage to Varicap diode $C_{132}$.

The resistances of the variable resistance elements $R_{12}$, $R_{11}$ and $R_{OB}$ are set at predetermined values by control signals from controller 34. For example, elements such as those shown in FIG. 8 are adopted as variable resistance elements $R_{12}$, $R_{11}$ and $R_{OB}$.

Figure 8A:
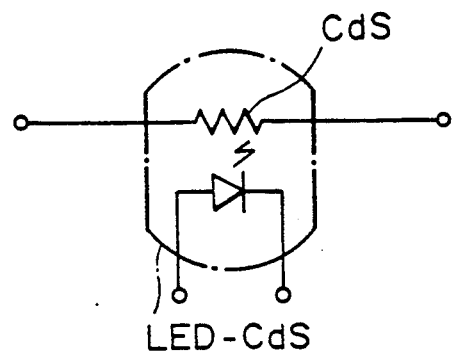
FIGS. 8(A) to 8(D) are the circuit diagrams of examples of a variable resistance element.

FIG. 8(A) shows a variable resistance element using an LED-CdS (Light Emission Cadmium Sulfide element). In the LED-CdS, the resistance of the cadmium sulfide element CdS varies in correspondence with the amount of light emission of the light emission diode LED. Since the amount of light emission of the light emission diode LED varies in correspondence with the amount of current, the resistance of the cadmium sulfide element CdS varies in correspondence with the amount of current. It is therefore possible to control the resistance by varying the amount of current.

Figure 8B:
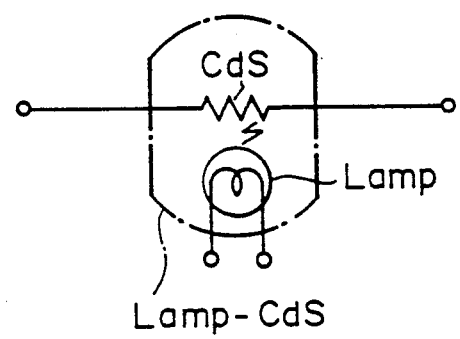

FIG. 8(B) shows a variable resistance element using a Lamp-CdS (Lamp Cadmium Sulfide element). In the variable resistance element, the amount of light emission varies in correspondence with the amount of current applied to the lamp Lamp, and the resistance of the cadmium sulfide element Cds varies in correspondence with the amount of light emission. It is therefore possible to control the resistance by varying the amount of current.

Figure 8C:
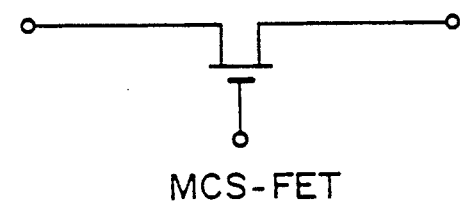

FIG. 8(C) shows a variable resistance element using a MOS-FET (Metal Oxide Semiconductor Field Effect Transistor). In the MOS-FET, the resistance between the source and the drain varies in correspondence with the voltage applied to the gate. It is therefore possible to control the resistance by varying the voltage applied to the gate.

Figure 8D:
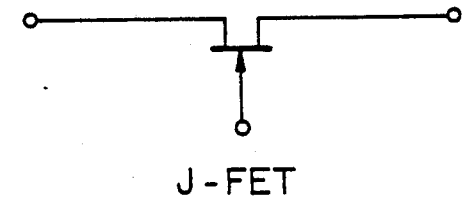

FIG. 8(D) shows a variable resistance element using a J-FET (Junction-type Field Effect Transistor). In this example, it is also possible to control the resistance by varying the voltage applied to the gate as in the case of MOS-FET.

In this way, if a variable resistance element such as those shown in FIGS. 8(A) to 8(D) is adopted, it is possible to control the resistance by an electric signal. It is therefore possible to set the resistance of the variable resistance element at a desired value if an electric signal is generated in accordance with a control signal from controller 34. It is also possible to adjust the voltage of the variable DC power source $E_V$ in accordance with a control signal from controller 34, thereby controlling the capacitance of the Varicap diode $C_{132}$.

As an example of the values of the resistors $R_{OB}$, $R_{11}$ and $R_{12}$ and the capacitor $C_{131}$, the following values will be cited from the relationship between telephone internal circuit 12 and the impedance $Z_L$:

If balance resistor $R_{10}$ has 10 times the value of balance resistor $R_9$, such as $R_9 = 47$ Ω

$R_{10} = 470$ Ω and the resistance of internal circuit 12 is set at 620 Ω, the resistance of resistor $R_{OB}$ in the balance adjustment circuit 14 is set at $$\begin{aligned} R_{OB} &= 10 \times Z_{SN} \\ &= 10 \times 620 \text{ Ω} \\ &= 6.2 \text{ kΩ} \end{aligned}$$

The values of resistors $R_{12}$, $R_{11}$ and capacitor $C_{13}$ in balance adjustment circuit 14 are set as follows in correspondence with the resistances of resistors $R_1$, $R_2$ and the stray capacitance C, respectively, in the circuit impedance $Z_L$:

$R_{12} = 10 \times R_1$ $R_{11} = 10 \times R_2$ $C_{13} = C/10$

In this way, the resistances and the static capacitance in balance adjustment circuit 14 are determined and set at these values by control signals from controller 34. It is therefore possible to so control bridge circuit 36 as to constantly satisfy the balancing condition by the adjustment of balance adjustment circuit 14:

$$(Z_L//Z_{SN}) \cdot R_{10} = Z_{BN} \cdot R_9$$

It will also be understood that by appropriately selecting the values of balance resistors $R_9$ and $R_{10}$, the resistances in balance adjustment circuit 14 become easily adjustable. In illustrated embodiment, balance resistors $R_9$ and $R_{10}$ are used, but any impedance elements having a constant ratio can produce the same effect, as is clear from the above formula.

Figure 9:
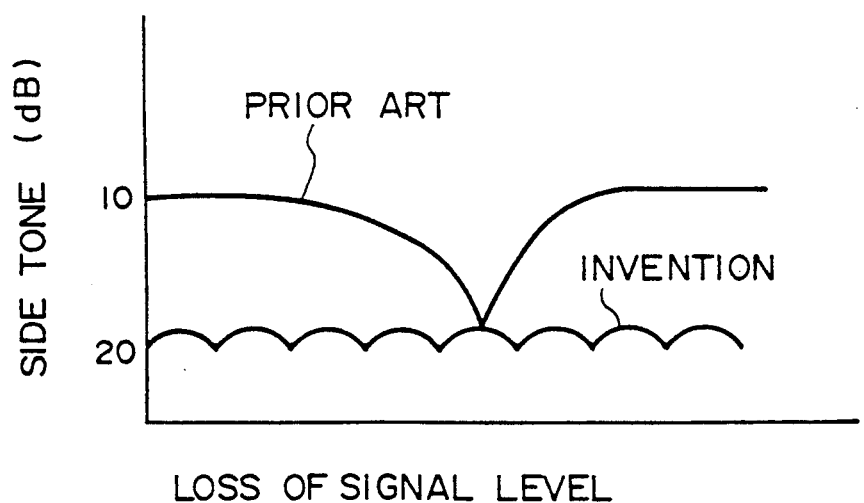
FIG. 9 is a characteristic curve of the side tone preventing property of the embodiment shown in FIG. 1.

FIG. 9 shows the side tone preventing characteristic of the bridge circuit in the disclosed embodiment. The abscissa represents a loss of a signal level (telephone line distance) in the external telephone circuit and the ordinate represents a side tone. From FIG. 9, it is clear that good side tone prevention is constantly carried out irrespective of a change in the loss of a signal level (telephone line distance) in the external telephone circuit. In contrast, in the prior art, when the loss of a signal level (telephone line distance) changes, good side tone prevention is obtained only at one point.

Thus, in this embodiment, a constant and good side tone prevention is achieved.

The adjustment is generally carried out at the time of installation of a telephone, but it may also be carried out when the circuit impedance changes, as occasion demands.

As described above, according to a side tone preventive circuit for telephones of the present invention, good side tone prevention is constantly carried out irrespective of a change in the circuit impedance.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A side tone preventive circuit for telephones comprising:
   an impedance measuring circuit which is connected to a connecting terminal of an external telephone circuit so as to measure the impedance of said external telephone circuit;
   a bridge circuit for connecting said connecting terminal with a receiver and a transmitter and balancing the impedance at the connecting terminal of said receiver,
   said bridge circuit including a telephone internal circuit having a predetermined impedance, balance impedance elements and a balance adjustment circuit; and
   a controller for controlling the impedance of said balance adjustment circuit in accordance with the result of the measurement obtained from said impedance measuring circuit;
   wherein the balancing condition of said bridge circuit is satisfied by changing the impedance of said balance adjustment circuit in accordance with the measured impedance of said external telephone circuit so as to prevent a side tone, and
   wherein said balance adjustment circuit includes two variable resistors connected in series, and a variable capacitor which is connected in parallel to either of said variable resistors, and each of said variable resistors in said balance adjustment circuit includes a plurality of resistors connected in series and switches connected in parallel to the respective resistors so as to short-circuit both ends of the respective resistors.

2. A side tone preventive circuit for telephones according to claim 1, wherein said variable capacitor in said balance adjustment circuit includes a plurality of capacitors connected in parallel and switches connected in series to the respective capacitors.

3. A side tone preventive circuit for telephones according to claim 1, wherein said variable resistor in said balance adjustment circuit comprises an LED-CdS.

4. A side tone preventive circuit for telephones according to claim 1, wherein said variable resistor in said balance adjustment circuit comprises a Lamp-CdS.

5. A side tone preventive circuit for telephones according to claim 1, wherein said variable resistor in said balance adjustment circuit comprises a MOS-FET.

6. A side tone preventive circuit for telephones according to claim 1, wherein said variable resistor in said balance adjustment circuit comprises a J-FET.

7. A side tone preventive circuit for telephones according to claim 1, wherein said impedance measuring circuit includes a resistor for measurement which is inserted between said connecting terminal of said telephone circuit and said bridge circuit, two voltmeters for measuring the voltages at both ends of said resistor, a switch for short-circuiting both ends of said resistor, and a change-over switch provided in the connecting circuit between said bridge circuit and said transmitter in connection with an oscillator so as to connect said oscillator to said bridge circuit in place of said transmitter.

8. A side tone preventive circuit for telephones according to claim 1, wherein said impedance measuring circuit includes a resistor for measurement which is inserted between said connecting terminal of said telephone circuit and said bridge circuit, two voltmeters for measuring the voltages of both ends of said resistor, a switch for short-circuiting both ends of said resistor, and a change-over switch provided in the connecting circuit between said bridge circuit and said transmitter in connection with an oscillator so as to connect said oscillator to said bridge circuit in place of said transmitter.

9. A side tone preventive circuit for telephones according to claim 1, wherein said impedance measuring circuit includes a change-over switch provided between said connecting terminal of said telephone circuit and said bridge circuit so as to connect a resistor for measurement to said impedance circuit in place of said bridge circuit, two voltmeters for measuring the voltages at both ends of said resistor connected to said change-over switch, and an oscillator connected in series to said resistor with the other end being grounded.

10. A side tone preventive circuit for telephones according to claim 1, wherein said impedance measuring circuit includes a change-over switch provided between said connecting terminal of said telephone circuit and said bridge circuit so as to connect a resistor for measurement to said impedance circuit in place of said bridge circuit, two voltmeters for measuring the voltages both ends of said resistor connected to said change-over switch, and an oscillator connected in series to said resistor with the other end being grounded.

11. A side tone, preventive circuit for telephones according to claim 1, wherein said impedance measuring circuit includes a change-over switch provided between said connecting terminal of said telephone circuit and said bridge circuit, an ampere meter connected to said change-over switch, an oscillator connected in series to said ampere meter with the other end being grounded, and a voltmeter connected to the connecting point of said change-over switch and said ampere meter.

12. A side tone preventive circuit for telephones according to claim 1, wherein said impedance measuring circuit includes a change-over switch provided between said connecting terminal of said telephone circuit and said bridge circuit, an ampere meter connected to said change-over switch, an oscillator connected in series to said ampere meter with the other end being grounded, and a voltmeter connected to the connecting point of said change-over switch and said ampere meter.

13. A side tone preventive circuit for telephones comprising:
   an impedance measuring circuit which is connected to a connecting terminal of an external telephone circuit so as to measure the impedance of said external telephone circuit, said impedance measuring circuit comprising oscillator means for generating at least one excitation signal at a predetermined frequency, resistance means connected in series between said oscillator means and said connecting terminal, and means for detecting the voltage drop across said resistance means;
   a bridge circuit for connecting said connecting terminal with a receiver and a transmitter and balancing the impedance at the connecting terminal with said receiver, said bridge circuit including a telephone internal circuit having a predetermined impedance, balance impedance elements and a balance adjustment circuit; and
   a controller for controlling the impedance of said balance impedance circuit in accordance with the result of the measurement obtained from said impedance measuring circuit so as to obtain a balanced condition in said bridge circuit in accordance with the measured impedance of said external telephone circuit and thereby prevent a side tone.

14. A side tone preventive circuit for telephones according to claim 13 wherein said balance adjustment circuit includes two variable resistors connected in series, and a variable capacitor which is connected in parallel to either of said variable resistors.

15. A side tone preventive circuit for telephones according to claim 13 wherein said resistance means comprises a resistor and said voltage drop detecting means comprises two voltmeters for measuring the voltages at both ends of said resistor.

16. A side tone preventive circuit for telephones comprising:
   an impedance measuring circuit which is connected to a connecting terminal of an external telephone circuit so as to measure the impedance of said external telephone circuit, said impedance measuring circuit comprising oscillator means for generating at least one excitation signal at a predetermined frequency, an ampere meter connected in series between said oscillator means and said connecting terminal, and voltage detecting means for detecting the voltage at said connecting terminal;
   a bridge circuit for connecting said connecting terminal with a receiver and a transmitter and balancing the impedance at the connecting terminal with said receiver, said bridge circuit including a telephone internal circuit having a predetermined impedance, balance impedance elements and a balance adjustment circuit; and
   a controlled for controlling the impedance of said balance impedance circuit in accordance with the result of the measurement obtained from said impedance measuring circuit so as to obtain a balanced condition in said bridge circuit in accordance with the measured impedance of said external telephone circuit and thereby prevent a side tone.

* * * * *